(No Model.)

J. J. COLE.
DEVICE FOR MEASURING CAR WHEELS.

No. 354,595. Patented Dec. 21, 1886.

Witnesses:
Allen Weinhardt
James H. Kron

Inventor.
John J. Cole
O. E. Duffy, atty

UNITED STATES PATENT OFFICE.

JOHN J. COLE, OF TERRE HAUTE, INDIANA.

DEVICE FOR MEASURING CAR-WHEELS.

SPECIFICATION forming part of Letters Patent No. 354,595, dated December 21, 1886.

Application filed August 14, 1886. Serial No. 210,927. (No model.)

*To all whom it may concern:*

Be it known that I, JOHN J. COLE, of Terre Haute, in the county of Vigo and State of Indiana, have invented certain new and useful Improvements in Measuring and Ascertaining the Circumference and Diameter of Car-Wheels; and I do hereby declare that the following is a full, clear, and exact description of the invention, which will enable others skilled in the art to which it appertains to make and use the same, reference being had to the accompanying drawings, and to the letters of reference marked thereon, which form part of this specification.

The object of this invention is the construction of an improved means for enabling the position of the jaws of a self-centering chuck to indicate the diameter, and therefore the circumference, of a circular object held thereby.

It is customary in one form of self-centering chuck to actuate radially-movable jaws by means of radial screws engaging therewith, and caused to revolve in unison by being provided with pinions intermeshing with a toothed annulus.

My invention consists in the combination, with such a chuck or one similar thereto, of a pointer operated by means of a pinion intermeshing with said toothed annulus, and by a dial-plate for indicating in suitable terms the dimensions of the article held by the jaws of the chuck.

Figure 1:
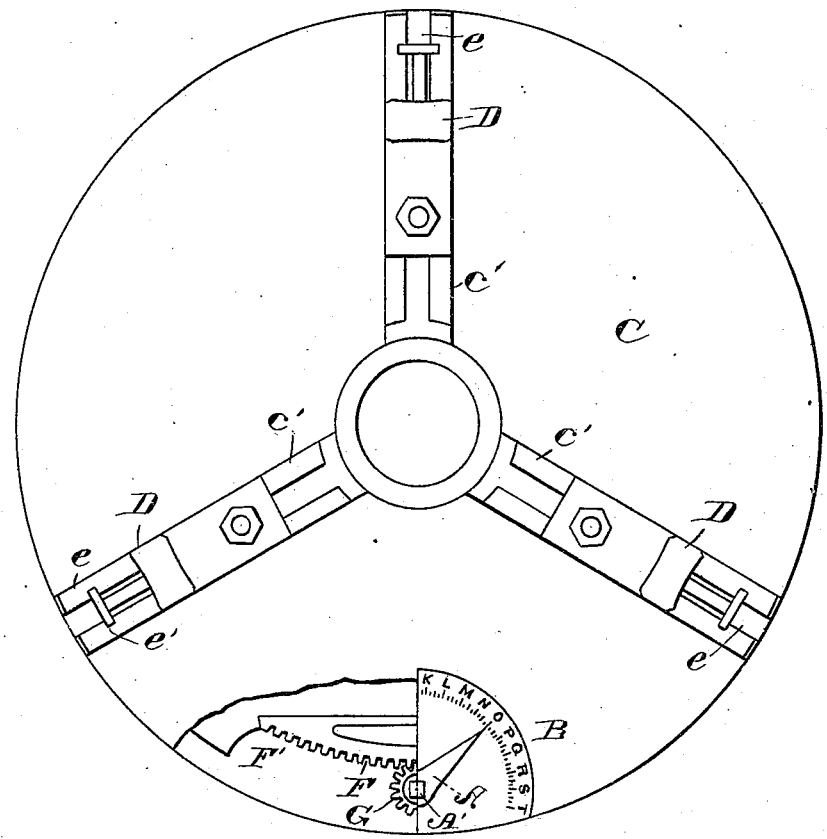
Figure 2:
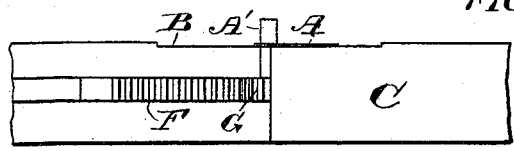

In the drawings connected with this specification, Figure 1 is a face elevation of the chuck having a portion broken away. Fig. 2 is a peripheral view of the portion of the chuck containing the dial-plate and pointer.

The chuck C is provided with the radial grooves $c'$, in which are the jaws D, movable by means of the bolts $e$. Said bolts are made to turn in unison by means of the toothed annulus F', intermeshing with pinions on said bolts. Said pinions are not shown in the drawings, as such construction is well known; but a portion of the said annulus in the neighborhood of the dial-plate B is represented. Said dial-plate I usually form by slightly recessing the face of the chuck and imprinting or otherwise forming therein the required indications of measurement. Concentric with said dial-plate, and parallel with the axis of the chuck, extends the short shaft A', upon whose outer end is rigidly secured the pointer A, and upon the inner portion of which is fastened the pinion G, adapted to intermesh with said annulus F', or with a toothed arc, F, fastened thereto. The latter is preferable, owing to the fact that such teeth are so arranged upon the circumference of the arc as to properly intermesh with the pinion G, while in the chuck described the teeth of the annulus, intermeshing with the pinions of the bolts E, are usually formed on the flat face of said annulus.

There are other forms of chucks not previously described to which my measuring device is applicable—as for instance, the chuck in which a disk is provided with a spiral groove engaging the jaws, whereby the rotation of said disk moves said jaws in unison. By attaching the arc F to said disk the desired measurement is obtained of the various circular objects held by said jaws.

The purpose for which I specially design my device is that of ascertaining the exact diameters and the consequent circumferences of car-wheels while they are being bored. In this way it is not necessary to measure the car-wheel by a separate operation and by an additional tool; but by the very act of fastening them in place upon the face-plate of the chuck the dial-plates indicate the exact measurements of the wheels. In this case the dial-plate is marked with indices and subdivisions thereof, as K L M, &c., in Fig. 1.

Since the car-wheels differ but little from each other, the toothed arc F need not be of large dimensions, and the pinion G may be small in diameter to make the pointer more delicate in its indications.

Having thus fully described my invention, what I claim, and desire to secure by Letters Patent of the United States, is—

1. The combination, with the jaw-actuating annulus of a self-centering chuck, of a pinion intermeshing with teeth on said annulus, a pointer connected with said pinion, and a dial-plate for said pointer, whereby are indicated the measurements of an article held by the chuck, substantially as described.

2. The combination, with the jaw-actuating annulus of a self-centering chuck, of the toothed arc F, secured to said annulus, the pinion G, intermeshing with said arc, the pointer A, connected with said pinion, and the dial-plate formed in the face of the chuck, substantially as described, for the purpose set forth.

3. The combination, with the chuck, of the radially-movable jaws D, bolts $e$, controlling said jaws, a toothed annulus intermeshing with said pinions, the pinion G, intermeshing with teeth on said annulus, the pointer A, connected with said pinion, and the dial-plate B, formed in said chuck, for the purposes specified.

In testimony that I claim the foregoing as my own I affix my signature in presence of two witnesses.

JOHN J. COLE.

Witnesses:
PETER M. FOLEY,
SAMUEL M. HUSTON.